United States Patent [19]
Kirtland

[11] Patent Number: 5,657,849
[45] Date of Patent: Aug. 19, 1997

[54] PRODUCT CONTROL APPARATUS

[75] Inventor: Dennis Alfred Kirtland, Ashby-de-la-Zouch, United Kingdom

[73] Assignee: W. H. Dunn & Son Limited, Leicestershire, England

[21] Appl. No.: 471,087

[22] Filed: Jun. 6, 1995

[30] Foreign Application Priority Data

Jun. 8, 1994 [GB] United Kingdom ............... 9411454

[51] Int. Cl.$^6$ .................................................. B65G 47/24
[52] U.S. Cl. ................................................................ 198/411
[58] Field of Search ........................................ 198/411–412

[56] References Cited

U.S. PATENT DOCUMENTS 5,209,338  5/1993  Kirtland ............................ 198/365

*Primary Examiner*—D. Glenn Dayoan
*Attorney, Agent, or Firm*—Adams Law Firm, P.A.

[57] ABSTRACT

In a high speed production line system, a conveyor is defined by groupings of transversely movable pallets 14, each grouping further including a central, transversely movable pusher 22 providing an abutment 24. When a pair of packs 16 of products 20 is delivered on to the pallets 14 in a group, the abutment 24 is adjacent one side of the packs 16 at the junction therebetween. As the packs 16 are moved along the conveying path, cam followers retain the pallets 14 in position and move the abutment 24 against the packs 16 to rotate the latter in opposite directions through 90°. Turning can be effected over a distance of less than one meter travel, both positively and accurately at high speeds.

10 Claims, 2 Drawing Sheets

PRODUCT CONTROL APPARATUS

This invention relates to product control apparatus and is particularly concerned with conveying of products in a production line system.

In a high speed production line system, it can be necessary at certain conveying sections to change the orientation of the products being conveyed, and this can often result in having to slow down or even stop the production line. Also it can be necessary to divert respective products into different paths of movement. Such operations have heretofore been carried out by separate systems, inevitably resulting in a relatively large overall machine which is disadvantageous, as optimum use of floor space is highly desirable.

According to the present invention there is provided product control apparatus comprising means for conveying products along a path and means for changing the orientation of the products during conveying movement along the path, wherein the conveying means includes support means adapted directly to receive products in pairs such that the latter can be moved relative thereto, and means arranged for engagement directly with the respective pair of products to simultaneously change the orientation of each of the latter relative to the support means.

Preferably the support means for each pair of products comprises support members extending transversely of the conveying path. Groups of the support members may be provided along the conveying path, and each group may comprise two pairs of the support members, each pair being spaced apart along the conveying path.

The product engagement means is preferably movable transversely of the conveying path in each spacing between the respective pairs of support members in each group, and the product engagement means may comprise an abutment which is upwardly extending in use and which can engage each product of each pair simultaneously, whereby to move each product through substantially 90° in opposite directions. Further, the product engagement means may include cam means engageable in a profiled track to control the transverse movement thereof. The cam means may extend downwardly in use.

Preferably means is provided for feeding products onto the conveying path in synchronism with the positioning of the product engagement means. An electronic control system may be provided for driving the product feeding means and the product conveying means in a synchronised relation. The control system may be adapted to automatically adjust the speed of the product conveying means on demand.

Also, means may be provided for automatically changing the position of the products during conveying movement along the path. The position changing means may be adapted to divert products supported by respective groups of support members into different paths of movement.

An embodiment of the present invention will now be described by way of example only with reference to the accompanying drawings, in which.

Figure 1:
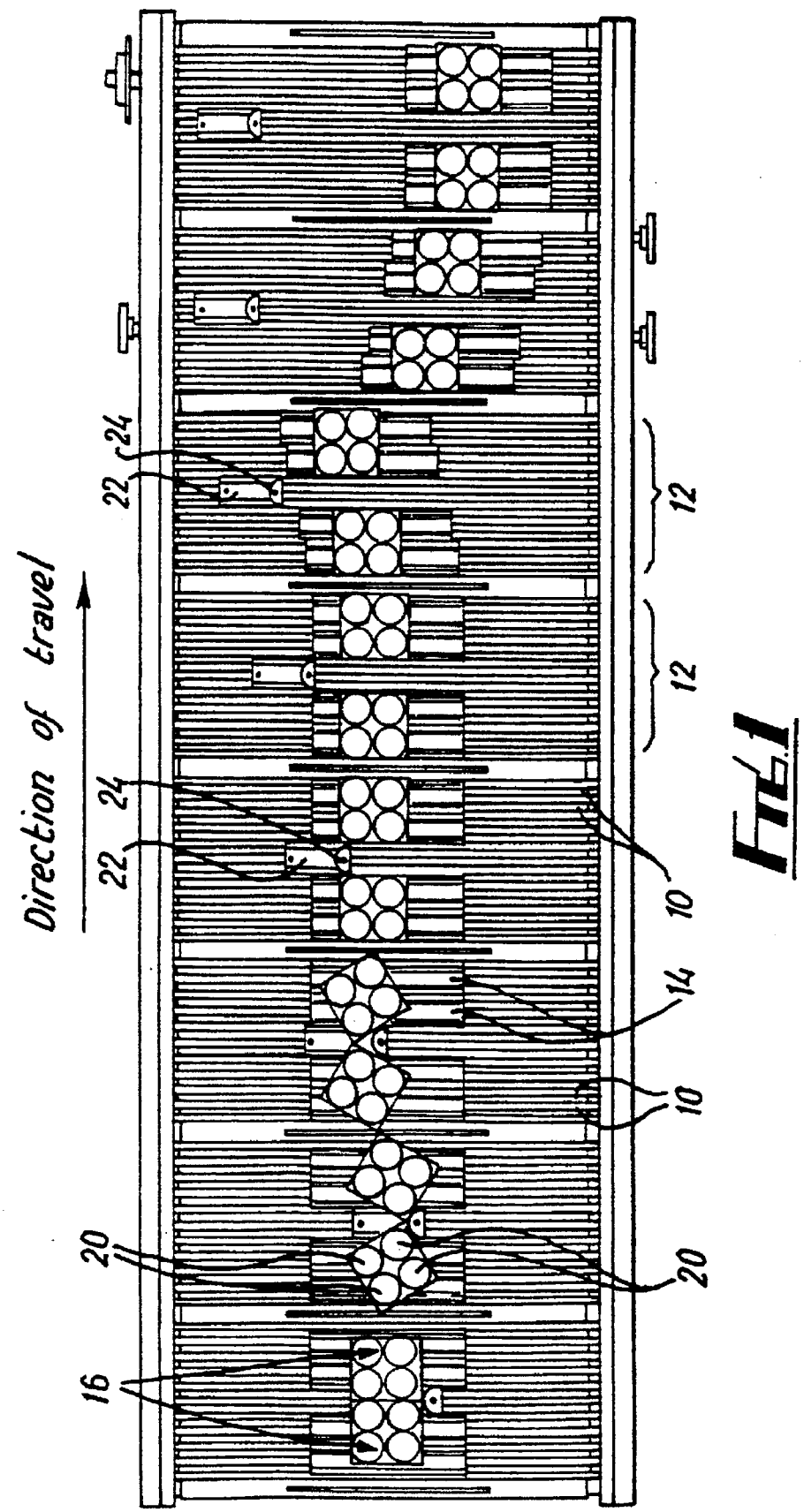
FIG. 1 is a schematic plan view of a product control apparatus according to the invention.
Figure 2:
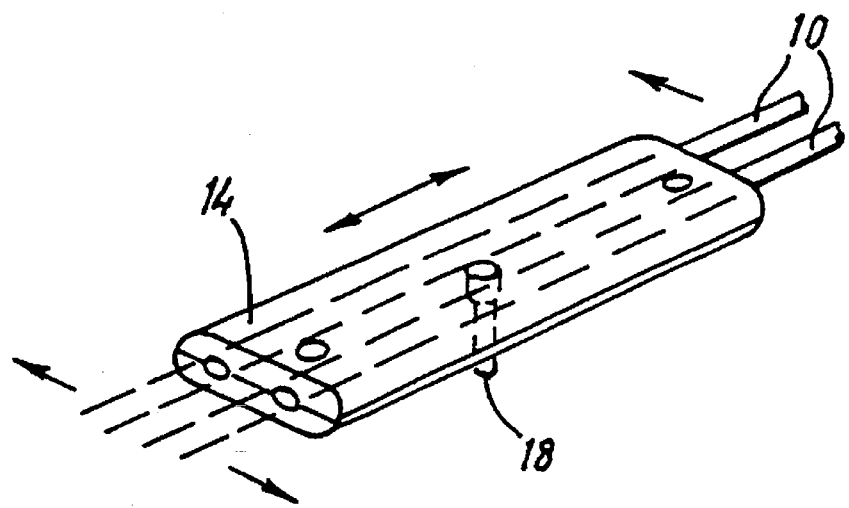
FIG. 2 is a schematic perspective view in detail of part of the apparatus of FIG. 1.
Figure 3:
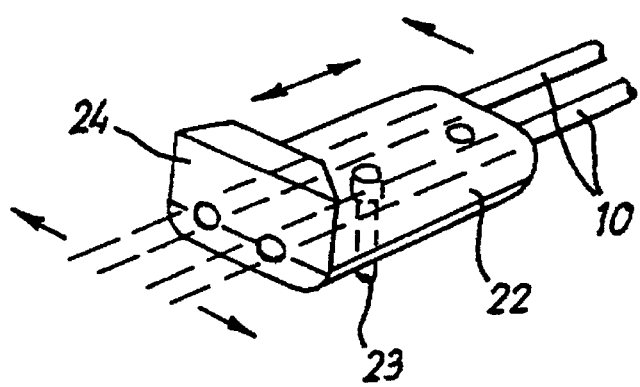
FIG. 3 is a schematic perspective view in detail of another part of the apparatus of FIG. 1.

Referring to the drawings, a high speed production line system includes a product conveying section having a pair of parallel, transversely spaced outboard precision roller chains driven by suitable drive sprockets. Extending between the chains and fitted to each chain roller pitch are a pair of parallel, spaced crossbars 10. There are five pairs of the crossbars 10 in each of a plurality of groups 12. On the crossbars 10 associated with each chain roller pitch of each outermost pair thereof in each group 12, is mounted a pallet 14 formed of two halves fitted together respectively from above and below the bars 10 whereby the latter extend through the respective formed pallet 14. The latter is slidable on the bars 10 and is of reduced length relative to the bars 10. The pallets 14 are preferably formed of a plastics material but any other suitable material could be utilised. It will be appreciated that the pallets in use collectively form, in each group 12, a pair of mats to act as a support for products in the form of packs 16 being conveyed thereon.

To provide for control of movement of the pallets 14 relative to the conveying path, each of the pallets 14 has a cam follower in the form of a downwardly extending peg 18 located substantially centrally of the length of the pallet 14. The peg 18 engages within a cam track (not shown) which is within the conveying section over the length of the conveying path and constrains the pallets 14 to move in a straight line centrally between the chains.

The conveying section is specifically designed for changing the orientation of a pair of abutting packs 16, each of the latter having four individual products 20, and being therefore square in configuration. Each pair of packs 16 can be delivered onto the conveying pallets 14 in a respective group 12 to overlie same. The conveying section is designed to move each pack 16 through 90° as shown.

For this purpose, each central pair of crossbars 10 in each group 12 slidably mounts a pusher 22 which has an upstanding abutment 24. Each of the pushers 22 has a cam follower in the form of a downwardly extending peg 23. A cam track is provided within the conveying section whereby transverse movement of the pushers 22 is controlled as hereinafter described.

When a pair of packs 16 of products 20 is delivered onto a group 12 of the conveying section, the packs 16 overlie the pallets 14 in the group 12 and also the pusher 22 therebetween. The cam track has such a profile initially that the abutment 24 of the pusher 22 is adjacent one side of the packs 16 at the junction between the abutting pair. As the packs 16 are moved along the conveying path, the profile of the pusher cam track is such as to move the pusher 22 whereby the abutment 24 engages against the packs 16 and consequently begins to rotate the latter in opposite directions. During continued movement along the conveying path, the pusher 22 continues to move transversely until the abutment 24 has moved the packs 16 through 90°, and each pack 16 overlies only the respective outermost pair of pallets 14 in the group 12.

The apparatus enables a turning action to re-position products being conveyed through 90° over a distance of less than one meter travel, and the turning can be carried out within a production line system at high speeds both positively and accurately.

At the end of the product turning section the pallets 14 continue through a further conveying section wherein the cam track for the pegs of the pushers 22 retain the latter in their outermost positions.

Also at the end of the product turning section, the cam track for the pegs of the pallets 14 is associated with set fork guides to divide into two guide tracks, or alternatively a switch block is provided, whereby alternate groups 12 of the pallets 14 supporting respective packs 16 of the products 21 are moved into one of the guide tracks, while the other groups 12 of the pallets 14 are moved into the other of the guide tracks. In this way the same pallets 14 as supported the packs 16 through the turning section, support the packs 16 also through the conveying section and simultaneously separate the packs 16 into different paths of movement for subsequent use as necessary. The packs may be divided, for example according to colour, size, etc. and can be subsequently moved via transfer rollers (not shown) onto an outgoing conveyor.

When reaching the end of the conveying section, return cam tracks are provided to guide both the pallets 14 and pushers 22 in a lower path, by means of their pegs, back to their original positions, to enable the turning and dividing operations to re-commence once the pallets 14 and pushers 22 return to the upper part of the conveying section at the product feed unit.

The delivery of packs 16 to the turning section has to be synchronised with the positioning of the pallets 14.

The delivery of the packs 16 is by way of a metering conveyor (not shown) from where the packs 16 are transferred to an acceleration conveyor. The latter functions to create gaps between adjacent abutting pairs of the packs 16 and moves the latter to an entry end of a feed unit (not shown).

Control of the apparatus is effected by way of an electronic control system which ensures synchronised operation of the product feed unit with the turning section. Also to minimise intermittent operation, the control system can automatically adjust the speed of delivery of products to the feed unit on demand. The control system further includes a mimic display indicative of the status of the apparatus.

Various modifications may be made without departing from the invention. For example the relative positions of the pallets may differ from that described and shown to accommodate different arrangements of products being conveyed. Also the construction of the pallets may differ from that described and shown, and the design of the product feed unit may also differ from that described, provided the required synchronism can be achieved.

The integration of the turning and dividing operations in a single apparatus provides the advantages of full utilisation of components and considerable reduction in overall length of the apparatus, for example one meter.

The apparatus is also adapted to be used in synchronism with different types of known equipment upstream of the turning section, such as a can or bottle orientor, a hi-cone jacket pack, cluster pack or other packaging or handling unit. The apparatus is therefore very versatile as well as making optimum use of the components thereof.

I claim:

1. Product control apparatus comprising conveying means for conveying products along a path and reorientation means for changing the orientation of the products during conveying movement along the path, wherein the conveying means includes support means adapted directly to receive products in pairs such that the latter can be moved relative thereto, and product engagement means comprising an abutment which is upwardly extending in use and which is adapted for engaging each product of each pair simultaneously to simultaneously change the orientation of each of the latter relative to the support means.

2. Apparatus according to claim 1, wherein the support means for each pair of products comprises support members extending transversely of the conveying path.

3. Apparatus according to claim 2, wherein groups of the support members are provided along the conveying path, and each group comprises two pairs of the support members, each pair being spaced apart along the conveying path.

4. Apparatus according to claim 3, wherein the product engagement means is movable transversely of the conveying path in each spacing between the respective pairs of support members in each group.

5. Apparatus according to claim 1, wherein the product engagement means includes cam means engageable in a profiled track to control the transverse movement thereof.

6. Apparatus according to claim 5, wherein the cam means extends downwardly in use.

7. Apparatus according to claim 1, wherein an electronic control system is provided for driving product feeding means for feeding products onto the conveying path and the product conveying means in a synchronised relation.

8. Apparatus according to claim 7, wherein the control system is adapted to automatically adjust the speed of the product conveying means on demand.

9. Apparatus according to claim 1, wherein means is provided for automatically changing the position of the products during conveying movement along the path.

10. Apparatus according to claim 9, wherein the position changing means is adapted to divert products supported by respective groups of support members into different paths of movement.

* * * * *